ized Patent Office 3,584,996
Patented June 15, 1971

3,584,996
MANUFACTURE OF CALCIUM HYPOCHLORITE
Gilbert O. Hughes, Johannesburg, Republic of South Africa, assignor to Klipfontein Organic Products Corporation Limited
Filed Mar. 17, 1969, Ser. No. 807,726
Claims priority, application Republic of South Africa, Apr. 8, 1968, 68/2,202
Int. Cl. C01b 11/06
U.S. Cl. 23—86                      1 Claim

ABSTRACT OF THE DISCLOSURE

Calcium hypochlorite is produced with relatively low calcium chloride content, by chlorinating an aqueous suspension of calcium hydroxide, removing liquid from the suspension on a filter or centrifuge to produce a cake, and contacting the cake with an aqueous sodium hypochlorite solution while maintaining the cake on the filter or centrifuge. Not only is the calcium chloride content greatly reduced, but also the amount of sodium hypochlorite can be reduced substantially below stoichiometric, e.g. 40 to 70% of stoichiometric.

---

Figure 1:
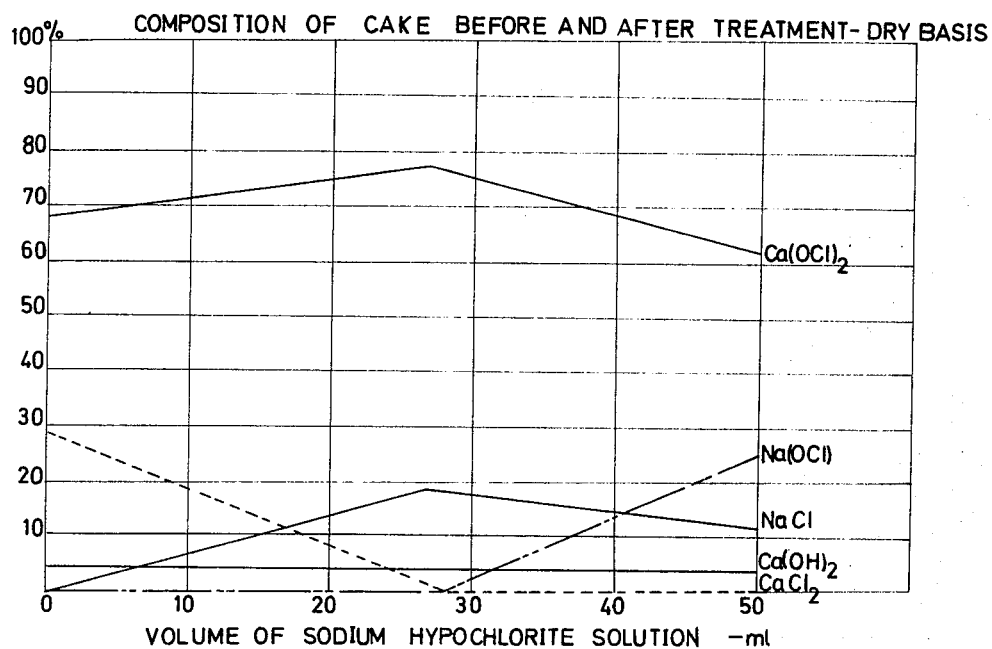

This invention relates to a process for the manufacture of calcium hypochlorite.

The general method of producing calcium hypochlorite commences with a chlorination of milk of lime, which consists of a suspension of calcium hydroxide in water or, in some situations, a mixture of calcium hydroxide and basic forms of calcium hypochlorite, the latter being recovered from subsequent steps in the process by the treatment of mother liquors containing hypochlorite in solution with hydrated lime. The chlorination step, when carried out to completion, yields neutral calcium hypochlorite, a portion of which crystallises out in very fine crystals and calcium chloride which remains in solution. The crystals of calcium hypochlorite can be separated from the slurry by means of a filter or a centrifuge which operation deposits a cake on the porous screen of the filter or centrifuge. As the crystals of calcium hypochlorite formed by this process are extremely fine, the cake formed on the filter or centrifuge can retain a substantial portion of the mother liquor, which is rich in calcium chloride. Depending on the techniques employed to improve the filterability of the suspension and the methods used for recovery of the solid, the cake on filter or centrifuge can contain between 30 and 60 parts of water per 100 parts of moist cake.

While attempts have been made to wash the cake with water to remove the mother liquor retained by the crystals, this has to be carried out judiciously, as calcium hypochlorite is soluble in water and washing the cake leads to loss of product. H. L. Robson, U.S. Pat. 2,368,042, found, when working with a neutral calcium hypochlorite of improved filterability, that washing with a light spray reduced the calcium chloride content of the moist cake to 3–4%, which would give a dried product with over 5% calcium chloride. It is unlikely that washing of the cake with water under the best conditions and in an economical manner can reduce the calcium chloride content of the dried product much below 3.5%, whereas a figure below 1.0% would be the preferred concentration.

Calcium chloride is an undesirable impurity as it creates difficulties in drying the calcium hypochlorite product and imparts an instability to the final product.

Many means have been proposed to reduce the calcium chloride content of the cake. A. George and R. B. MacMullin (U.S. Pat. 1,713,650) added concentrated sodium hypochlorite solution to the cake and followed this by thorough mixing and drying. The sodium hypochlorite reacts with the calcium chloride to form calcium hypochlorite and sodium chloride, which is left in the cake. This may be illustrated by the equation:

$$2NaOCl + CaCl_2 \rightarrow Ca(OCl)_2 + 2NaCl$$

This procedure, while it reduces the calcium chloride content down to acceptable levels, requires an additional mixing operation after the filtration or centrifuging step. It also adds additional water to the cake, which has to be removed in a subsequent drying step. This additional water may also interfere with the successful pre-forming of the moist cake prior to drying as has been described by H. L. Robson and G. A. Petroe in U.S. Pat. 2,219,660. Further disadvantages are that sodium hypochlorite at least in chemically equivalent proportions to the calcium chloride present must be added to the cake and all the products of the reaction between the sodium hypochlorite and the calcium chloride remain in the calcium hypochlorite product.

Other well known procedures have been introduced to make use of this useful reaction between sodium hypochlorite and calcium chloride to yield the desired end product, calcium hypochlorite, and a diluent, sodium chloride, which does not reduce the stability of the end product in the manner that calcium chloride is known to do. For example, mixtures of caustic soda and calcium hydroxide in definite proportions are added to water and chlorinated to yield netural calcium hypochlorite and sodium chloride in solution. After separation on a filter or centrifuge, a product substantially free of calcium chloride is obtained. Such processes, while they do not require an additional step to bring about the reaction between sodium hypochlorite and calcium chloride, yield a filtrate that contains mixed calcium and sodium salts. When, after treatment with lime to recover hypochlorite values in the form of a precipitate of basic calcium hypochlorites, as is customary, the final effluent from the operation still contains a mixture of calcium and sodium salts in solution. This is a disadvantage in areas where effluents of this nature cannot be tolerated. For example, it is not possible to convert such solutions directly to pure calcium chloride, which may be recovered for sale, and chlorine, which can be recycled to the process, by the treatment of such effluents with hydrochloric acid.

It is an object of the present invention to provide a method for producing a calcium hypochlorite product substantially free of calcium chloride impurity.

According to the invention, a process for reducing the calcium chloride content of a calcium hypochlorite product containing calcium chloride comprises treating the product on a filter or a centrifuge with a solution of sodium hypochlorite.

Further according to the invention there is provided, in a process for the preparation of a calcium hypochlorite product substantially free of calcium chloride comprising chlorinating a suspension of calcium hydroxide in water, and separating on a filter or centrifuge the formed calicum hypochlorite product from the mother liquor, the improvement of treating the product with a solution of sodium hypochlorite substantially to reduce the calcium chloride content thereof.

Still further according to the invention the amount of sodium hypochlorite used is substantially less than the chemical equivalent of the calcium chloride present in the calcium hypochlorite product before treatment.

Yet again according to the invention, the amount of sodium hypochlorite used is in the range of between 40% and 70% of the chemical equivalent of the calcium chloride present in the calcium hypochlorite product before treatment.

Still further according to the invention the concentration of the sodium hypochlorite solution is approximately 40%.

In a preferred method of carrying out the process of this invention, suspensions of calcium hydroxide in water are chlorinated to yield a neutral calcium hypochlorite slurry which is then passed to a filter, such as a batch filter or a continuous drum filter equipped with a washing device or to a centrifuge, such as an automatic centrifuge fitted with timers, enabling a repetitive cycle, involving the feed of the slurry to the centrifuge, draining under centrifugal action, treatment of the cake with known amounts of solution and subsequent draining, followed by discharge of the cake from the centrifuge, to be carried out in a controlled manner. After the cake formed by filtering or centrifuging the chlorinated slurry has been drained down to acceptable water contents, the calcium chloride content of the cake is reduced by treating the cake with a measured quantity of a sodium hypochlorite solution, without disturbing the cake on the filter or centrifuge. This procedure provides a moist calcium hypochlorite product substantially free of calcium chloride and containing some sodium chloride. It has been found possible to adjust the quantity of sodium hypochlorite solution to a point where only minor quantities of sodium are found in the liquors drained from the cake after treatment. Substantially less sodium hypochlorite than that chemically equivalent to the original calcium chloride present in the cake is employed. The cake after treatment in this manner contains less sodium chloride than that equivalent to the original calcium chloride present in the cake.

The invention will now be illustrated by the following example:

A suspension of hydrated lime in water containing about 27% $Ca(OH)_2$, was chlorinated to just short of the neutral calcium hypochlorite stage. Six 267 gram portions of the slurry were filtered individually on 4-inch diameter Buchner funnels under a vacuum of 20 mm. Hg for a period of 15 minutes with slight pressing to yield cakes of about equal weights. The filtrates were discarded. One cake was not given any treatment, but the remaining five cakes were treated with varying amounts of a solution of sodium hypochlorite containing 40.1 g. NaOCl and 9.5 g. NaCl per 100 ml. of solution. A measured quantity of sodium hypochlorite solution was added to each cake and 20 mm. Hg suction applied for a period of 15 minutes with slight pressing. The weight and composition of all six cakes and the volume and composition of the wash liquor obtained from each treatment were determined. The results are given in Table 1.

The figures illustrate the advantages to be gained by the process of this invention and the optimum conditions of the process.

FIG. 1 is a plot of the change in the composition of the cake, as presented in Table 1, after treatment with increasing quantities of sodium hypochlorite solution. This reveals that there is a decrease in the calcium chloride content and an increase in the sodium chloride content as the addition of sodium hypochlorite to the cake is increased. This value passed through an optimum, at about 27.4 ml. sodium hypochlorite solution, when the calcium chloride content reaches zero. Increasing the volume of sodium hypochlorite solution beyond this value results in a decrease in the calcium hypochlorite and an increase in the sodium hypochlorite content.

Figure 2:
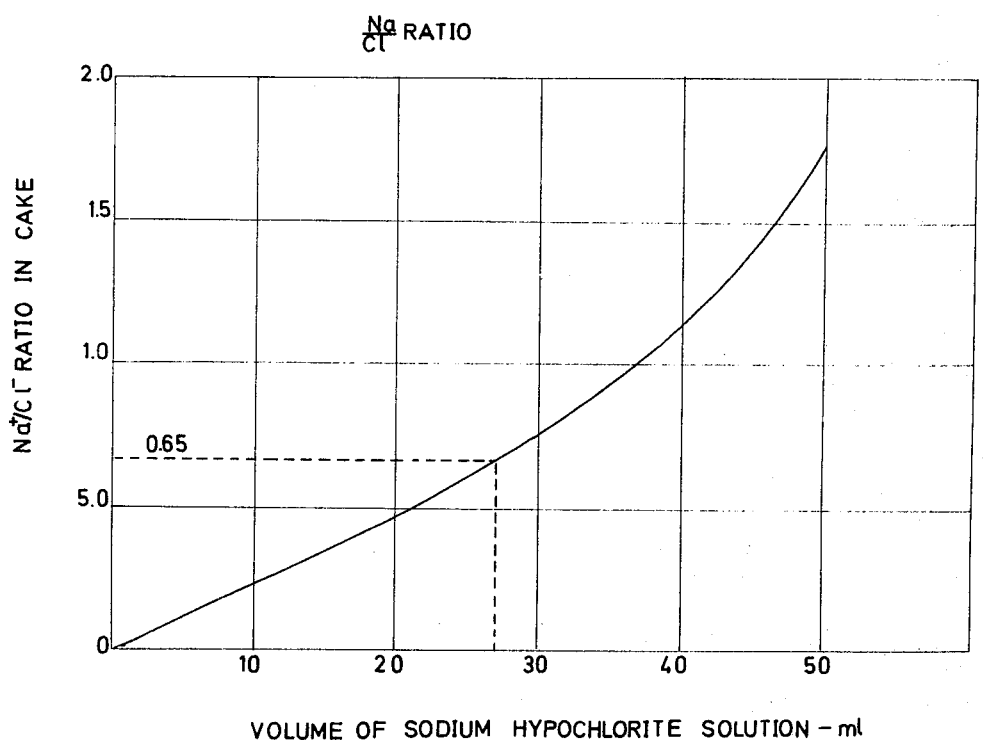

FIG. 2 expresses the change in the ratio of the sodium ions to the chloride ions present in the cake with increasing addition of sodium hypochlorite solution to the cake. The cake will contain all chloride ions in the form of sodium chloride when the $Na^+/Cl^-$ ratio is equal to the ratio of the atomic weights of sodium and chlorine, that is 23.00/35.54 or 0.65. This ratio is found to occur also at a volume of sodium hypochlorite solution equivalent to 27.4 ml. to about 120 g. cake. It should be noted that the suspension employed in this particular example was of poor filterability yielding cakes of relatively high water contents, i.e. over 55%. If this cake had been mixed with the 40.1 g./100 ml. sodium hypochlorite solution employing known methods to reduce the calcium chloride content, the quantity of solution required would be 51.7 ml. and the product would contain 70.9% $Ca(OCl)_2$ and 26.5% NaCl on a dry basis which is not acceptable by present day standards. By the process of this invention, reading off FIG. 1, only 27.4 ml. of sodium hypochlorite solution need be employed representing a saving of 47%. The final product contains 78% $Ca(OCl)_2$ and 18.5% NaCl, which is an excellent result from a suspension of poor filterability. The employment of suspensions with improved filterability on a centrifuge would provide cakes with lower water contents and yield products with still lower NaCl contents and higher $Ca(OCl)_2$ contents, if the process of the invention is applied.

Table 1 also provides an analysis of the liquors obtained from treatment of the calcium hypochlorite cakes with sodium hypochlorite solution as described above. If the optimum volume of sodium hypochlorite, 27.4 ml., is employed, the liquor will consist substantially of calcium salts in solution with about 1.0 g. NaCl/100 ml. If this liquor is blended with the remainder of the effluent from the calcium hypochlorite process and the mixture treated with hydrochloric acid to decompose the hypochlorite ion, and then evaporated, followed by drumming out or flaking, the calcium chloride product will contain substantially less than the 1.5% NaCl allowed in commercial calcium chloride. This will allow effluent wastes to be converted to a useful by-product calcium chloride which is an advantage in those countries where there are restrictions on the disposal of such effluents.

TABLE 1

| Volume of sodium hypochlorite added to cake, ml. | Cake after treatment [1] | | | | | | | Wash liquor | | | | |
|---|---|---|---|---|---|---|---|---|---|---|---|---|
| | Weight, grams | Water content, percent | Composition, dry basis (percent) | | | | | Volume, ml. | Composition g./100 ml. | | | |
| | | | $Ca(OCl)_2$ | $Ca(Cl)_2$ | Na(OCl) | NaCl | $Ca(OH)_2$ | | $Ca(OCl)_2$ | $CaCl_2$ | NaCl | $Ca(OH)_2$ |
| 10 | 119 | 53.6 | 70.9 | 18.2 | 0.0 | 7.5 | 3.5 | 16 | 11.8 | 22.2 | 0.0 | 0.6 |
| 20 | 120 | 52.0 | 75.2 | 7.1 | 0.0 | 17.2 | 3.4 | 25 | 11.8 | 22.2 | 1.0 | 0.4 |
| 30 | 119 | 50.2 | 76.5 | 0.0 | 2.7 | 17.6 | 3.2 | 34.5 | 12.2 | 21.3 | 1.0 | 0.5 |
| 40 | 121 | 49.2 | 69.1 | 0.0 | 14.2 | 13.7 | 3.1 | 44 | 12.3 | 21.4 | 2.2 | 0.4 |
| 50 | 122 | 48.2 | 62.1 | 0.0 | 24.2 | 10.8 | 3.0 | 53 | 12.3 | 21.0 | 3.4 | 0.4 |

[1] See the following table:

| Cake prior to treatment | | | | |
|---|---|---|---|---|
| Weight, grams | Water content, percent | Composition, dry basis (percent) | | |
| | | $Ca(OCl)_2$ | $CaCl_2$ | $Ca(OH)_2$ |
| 122 | 55.4 | 67.8 | 28.4 | 3.8 |

I claim:

1. In a process for reducing the calcium chloride content of a calcium hypochlorite cake product containing calcium chloride, produced by chlorinating an aqueous slurry of calcium hydroxide and after which water is removed from the chlorinated slurry on a filter or centrifuge to form a cake on the filter or centrifuge; the improvement comprising contacting said cake with sodium hypochlorite solution in an amount substantially less than the chemical equivalent of the calcium chloride while maintaining said cake on the filter or centrifuge, thereby reducing the calcium chloride content of the product to about zero while leaving a product containing at least about 78% calcium hypochlorite.

References Cited

UNITED STATES PATENTS

| | | | |
|---|---|---|---|
| 1,713,650 | 5/1929 | George | 23—86 |
| 1,718,286 | 6/1929 | Guyer | 23—86 |
| 1,937,230 | 11/1933 | Kitchen | 23—86 |
| 1,937,613 | 12/1933 | Weber, Jr. | 23—86 |
| 3,134,641 | 5/1964 | Gleichert | 23—86 |

EDWARD STERN, Primary Examiner

U.S. Cl. X.R.

252—187